United States Patent
Ohyama

(10) Patent No.: US 6,594,274 B1
(45) Date of Patent: Jul. 15, 2003

(54) DETECTION CIRCUIT FOR DETECTING STATE OF USE OF B CHANNEL AND ISDN TERMINAL USING THE SAME DETECTION CIRCUIT

(75) Inventor: Hirofumi Ohyama, Tokyo (JP)

(73) Assignee: NEC Infrontia Corporation, Tokyo (JP)

(*) Notice: Subject to any disclaimer, the term of this patent is extended or adjusted under 35 U.S.C. 154(b) by 0 days.

(21) Appl. No.: 09/246,725

(22) Filed: Feb. 9, 1999

(30) Foreign Application Priority Data

Feb. 11, 1998 (JP) .......................... 10-044668

(51) Int. Cl.[7] .......................... H04L 12/403
(52) U.S. Cl. .................. 370/450; 370/459; 370/461; 370/522; 379/337
(58) Field of Search ................ 370/431, 445, 370/446, 449, 450, 459, 461, 522, 904; 379/337; 455/528

(56) References Cited

U.S. PATENT DOCUMENTS

| | | | |
|---|---|---|---|
| 4,053,712 A | * 10/1977 | Reindl | 179/15.55 T |
| 4,700,344 A | * 10/1987 | Kaino et al. | 370/94 |
| 4,803,679 A | * 2/1989 | Shimizu | 370/95 |
| 5,701,299 A | * 12/1997 | Umezu | 370/376 |
| 5,930,260 A | * 7/1999 | Huang | 370/420 |
| 6,075,814 A | * 6/2000 | Yamano et al. | 375/222 |

FOREIGN PATENT DOCUMENTS

| | | |
|---|---|---|
| JP | 02-224448 | 9/1990 |
| JP | 02-239762 | 9/1990 |
| JP | 2-239762 | 9/1990 |
| JP | 3-96148 | 4/1991 |
| JP | 03-96148 | 4/1991 |
| JP | 03-135256 | 6/1991 |
| JP | 03-155247 | 7/1991 |
| JP | 3-155247 | 7/1991 |
| JP | 03-155248 | 7/1991 |
| JP | 05-110560 | 4/1993 |
| JP | 05-276231 | 10/1993 |
| JP | 8-98225 | 4/1996 |
| JP | 10-257049 | 9/1998 |

* cited by examiner

*Primary Examiner*—Hassan Kizou
*Assistant Examiner*—Anh-Vu Ly
(74) *Attorney, Agent, or Firm*—Sughrue Mion, PLLC

(57) ABSTRACT

A serial/parallel converter 2—converts a B channel data in an ISDN into an 8-bit parallel data and outputs it to a latch circuit 3. A comparator 4—compares an octet data latched by the latch circuit 3 with a preset idle pattern and, when the octet is different from the preset idle pattern, outputs a disaccord signal to a pulse generator 5. When an idle pattern appears continuously on the B channel, a timer circuit 6 outputs a significant signal. With using the significant signal from the timer circuit 6, it is possible to judge that the B channel is in non-use state, so that it can be determined by the simple circuit construction whether or not the B channel is in the use state.

9 Claims, 5 Drawing Sheets

DETECTION CIRCUIT FOR DETECTING STATE OF USE OF B CHANNEL AND ISDN TERMINAL USING THE SAME DETECTION CIRCUIT

CROSS REFERENCE TO RELATED APPLICATIONS

The present invention claims priority from Japanese Patent Application No. 1004668 filed Feb. 11, 1998, the contents of which are incorporated herein by reference.

BACKGROUND OF THE INVENTION

1. Field of the Invention

The present invention relates to a detection circuit for detecting the state of use of B channel of an Integrated Services Digital Network (ISDN) and an ISDN terminal equipment including the detection circuit and, particularly, a detection circuit for detecting the state of use of B channel suitable to be applied to a terminal equipment in a system in which a plurality of terminal equipments are connected to a single ISDN and the ISDN terminal equipment.

2. Description of Related Art

FIG. 1 is a block diagram showing an example of a communication system to be connected to an ISDN. In FIG. 1, the ISDN is connected to a user side through a network terminal (NT) 100. It is assumed here that the ISDN serves the basic rate interface. In this example, a main control device 200 of a key telephone system and an ISDN multi-function telephone set 300 are connected to a bus 400 on the user side. The main control device 200 of the key telephone system includes an ISDN S/T reference point interface portion 210 which performs a protocol processing of layers 2 and 3, etc., and a key telephone set interface portion 220 which is connected to key telephone sets 231, 232 and 233 and realizes an extension exchange function and a line wire originating/terminating call functions, etc.

In such system, when, for example, the ISDN multi-function telephone set 300 is performing a communication by using the B channel, the main control device 200 of the key telephone system can not recognize that the B channel of the ISDN is being used by the ISDN multi-function telephone set 300. It is usual that each of the key telephone sets 231, 232 and 233 has an office telephone button by which an information of whether or not the two B channels are being used is displayed. Therefore, even when the ISDN multi-function telephone set 300 is using the B channel, the display of the office telephone buttons of the key telephone sets 231, 232 and 233 becomes as if two B channels are being not used. When one of the key telephone sets, say, the key telephone set 232, makes an originating call, the office telephone buttons of the remaning key telephone sets 231 and 233 indicate as if one of the two B channels is used and the remaining B channel is not used. Therefore, the remaining key telephone sets 231 and 233 are allowed to make a call through the remaining B channel and the call may be performed. However, since there is no empty B channel practically. The fact that the use of the network for the originating call from any one of the remaining key telephone sets is impossible is recognized only after an exchange of control messages is performed by using the ISDN and a D channel.

On the contrary, in a case where line wire communications are performed by two key telephone sets through the two B channels, the ISDN multi-function telephone set 300 can not recognize an absence of usable B channel and, therefore, the ISDN multi-function telephone set 300 is allowed to send an originating call. However, when the ISDN multi function telephone set 300 sends the originating call, the fact that the use of the ISDN for the originating call therefrom is impossible is recognized only after an exchange of control messages is performed by using the ISDN and the D channel.

As mentioned, in a case where a number of terminal equipments are connected to the user bus 400 and one of the terminal equipments is using one of the B channels, the remaining terminal equipments can not recognize the fact that the one terminal equipment is using the B channel. Therefore, there may be a case where an originating call from a terminal equipment is allowed even if there is practically no usable B channel. However, such originating call from the terminal equipment can not be connected to a destination. That is, a man-machine interface which is inconvenient for users is employed.

In order to avoid such inconvenience, a system in which the state of use of B channel of one terminal equipment is detected by monitoring and analyzing a content of the D channel for all of terminal equipments including the one terminal equipment on the basis of terminal addresses by using service access point identifiers (SAPI) and terminal end point identifiers (TEI) has been proposed in, for example, Japanese Patent Application Laid-open No. Hei 3-155247. Further, a system in which the state of use of B channel is detected by utilizing a user-user interface served by the D channel and a D channel packet has been proposed in, for example, Japanese Patent Application Laid-open No. Hei 3-96138. Furthermore, a system in which the state of use of B channel is detected by monitoring both the D channel and the B channels and accumulating B channel data after a communication connection through the D channel is confirmed has been proposed in, for example, Japanese Patent Application Laid-open No. Hei 2-239762.

However, in the system disclosed in Japanese Patent Application Laid-open No. Hei 3-155247 in which the processing of the layers 2 and 3 for other terminal equipments must be executed, the load of firmware of the terminal equipment becomes too large to practice this system. On the other hand, the system disclosed in Japanese Patent Application Laid open No. Hei 3-96148 can be totally realized by mounting similar functions on all of terminal equipments connected by the bus and a destination terminal equipment and the system may be realized only limitedly in the ISDN which is a public network. Further, since, in the system disclosed in Japanese Patent Application Laid-open No. Hei 2 239762, data of the B channels must be accumulated in addition to the monitoring of the D channel, the load on the firmware of the terminal equipment is increased and so it is impractically.

SUMMARY OF THE INVENTION

In view of the circumstances, an object of the present invention is to provide a detection circuit for detecting the state of use of B channel, with which it is easily possible to judge whether B channels of an ISDN is being used, by using a simple hardware or a firmware.

The detection circuit for detecting the state of use of B channel according to the present invention comprises comparison means for comparing a B channel data of an ISDN with a preset idle pattern and use state output means for supplying a signal indicative of a state of use of B channel on the basis of a result of comparison from the comparison means.

The comparison means may have a construction for either comparing a parallel-converted B channel data with the idle pattern or comparing a B channel serial data with the idle pattern.

The detection circuit further comprises continuity detection means for detecting a continuity of the result of comparison of the comparison means and the use state output means may be constructed such that the continuity detection means outputs a signal indicative of the state of use of B channel when the use state output means detects a continuity of the comparison result.

The detection circuit further comprises pattern setting means capable of setting a plurality of idle patterns and the comparison means may be constructed such that it compares a specific idle pattern output from the pattern setting means with the B channel data.

Further, an ISDN terminal equipment according to the present invention comprises an S/T point interface portion connected to an S/T point interface of an ISDN interface, a terminal control portion for controlling a terminal function and a man-machine interface portion and a detection circuit for detecting a use/non-use of the B channels of the ISDN, wherein the detection circuit comprises comparison means for comparing a B channel data of an ISDN with a preset idle pattern and use state output means for supplying a signal indicative of a state of use of B channel on the basis of a result of comparison from the comparison means.

The terminal control portion may be constructed such that the state of use of B channel in the man-machine interface portion is displayed as being in the use state when an output signal of the use state output means indicates that the B channels are being used and the state of use of B channel in the man-machine interface portion is displayed as being in the non-use when the output signal of the use state output means indicates that the B channels are not used.

BRIEF DESCRIPTION OF THE DRAWINGS

Preferred embodiments of the present invention will be described with reference to the accompanying drawings, in which.

DETAILED DESCRIPTION OF THE PREFERRED EMBODIMENTS

Figure 2:
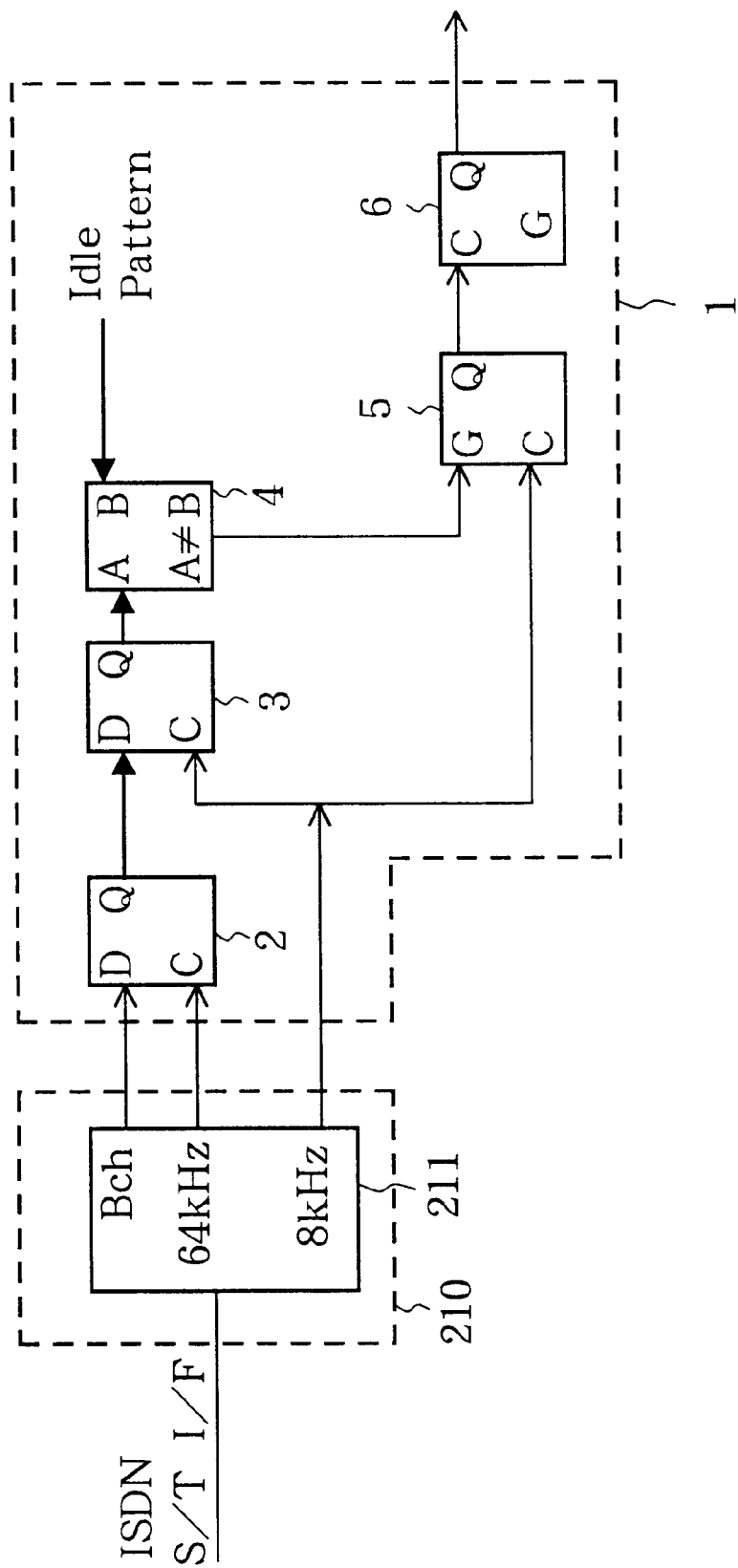
FIG. 2 is a block diagram showing an embodiment of a detection circuit for detecting a state of use of a B channel, according to the present invention.

FIG. 2 is a block diagram showing an embodiment of a detection circuit 1 for detecting the state of use of B channel, according to the present invention. As shown in FIG. 2, an S/T point interface LSI 211 contained in an S/T point interface portion 210 of an ISDN extracts a B channel data, a 64 kHz clock signal and a 8 kHz clock signal. In this embodiment, the B channel data is always output from the S/T point interface LSI 211 in a synchronized state in the layer 1.

The detection circuit 1 for detecting the state of use of B channel includes a serial/parallel converter 2 for converting the B channel serial data from the S/T point interface portion 210 into an 8-bit parallel data, a latch circuit 3 for latching the 8-bit parallel data with the 8 kHz clock signal from the S/T point interface portion 210, a comparator 4 which compares the data latched by the latch circuit 3 with an idle pattern on the B channel in the non-use state and outputs a disaccord signal when they are disaccord with each other, a pulse generator 5 for generating a pulse signal on the basis of the disaccord signal from the comparator 4 and a timer circuit 6 which outputs a signal indicating that the B channel is not used, when the disaccord signal continues for a predetermined time period.

In the state in which the B channel is not used, the idle pattern appears repeatedly on the B channel. The idle pattern depends upon the specification of the ISDN exchange and becomes, for example, "01111111" or "11111111". Therefore, if it is possible to detect the repeatedly appearing idle pattern on the B channel, it can be known that the B channel is not used. Considering data to be transmitted/received through the B channel of the ISDN as those of an audio data system and a data communication system, separately, the data of the audio system is a PCM (pulse code modulation) data obtained by a CODEC and that of the data communication system is mainly a packet data obtained by a HDLC (high level data link control protocol) frame.

The PCM data obtained by the CODEC of the audio system always contains white noise. Therefore, identical data do not appear repeatedly even in a time period in which there is no data on an input side of the CODEC, when the data is monitored in octet unit every network-synchronized 8 kHz frame of the ISDN. In a period in which data exists, there is, of course, no case where the idle pattern appears repeatedly. Therefore, there is no case where the idle pattern appears repeatedly in the network-synchronized period of the ISDN.

On the other hand, in the packet data obtained by the HDLC frame, a flag pattern ("01111110") always exists in a data stream. In a period of a data transfer by means of the HDLC frame, in which there is no data, the flag pattern is sent continuously. Even in a data communication of other system, the frame construction is almost always employed in lower layers.

From the foregoing, the B channel can be judged as being not used when the data is monitored in octet unit every network-synchronized 8 kHz frame of the ISDN and the idle pattern such as "01111111" or "111111111" is continuously detected. The detection circuit 1 shown in FIG. 2 is an example of a circuit for detecting the state of use of B channel on the basis of this consideration.

Now, a concrete operation of the detection circuit 1 will be described.

The serial/parallel converter 2 converts the B channel data sent from the ISDN toward the terminal equipments into an 8-bit parallel data by using the 64 kHz clock signal and outputs the 8-bit parallel data to the latch circuit 3. The latch circuit 3 latches the 8-bit parallel data every network-synchronized 8 kHz frame of the ISDN. The comparator 4 compares the octet data latched by the latch circuit 3 with the preset idle pattern. If the octet data is disaccord with the preset idle pattern, the comparator 4 outputs a disaccord signal to the pulse generator 5.

In this embodiment, the pulse generator 5 samples the output of the comparator 4 every 8 kHz frame. Therefore, when the disaccord signal is output from the comparator 4, the pulse generator 5 outputs a pulse signal correspondingly thereto. The timer circuit 6 starts to time by using the pulse signal from the pulse generator as a trigger signal and outputs a significant signal to the pulse generator 5 when a predetermined time lapses therefrom. The predetermined time is updated every time when a pulse signal is input from the pulse generator 5 to the timer circuit 6. When the predetermined time is, for example, 10 ms and a next pulse is generated after 2 ms from a termination of the preceding pulse generation, a measurement of the predetermined time is started again by the next pulse signal.

Therefore, any significant signal is not output from the timer circuit 6 so long as the disaccord signal is output from the comparator 4. On the other hand, when a disaccord signal is output by the comparator 4 for the predetermined time, the timer circuit 6 outputs a significant signal. An absence of the disaccord signal for the predetermined time means that the idle pattern exists continuously on the B channel for the predetermined time. That is, when the idle pattern appears continuously on the B channel, a significant signal is output from the timer circuit 6. Therefore, when a significant signal is output from the timer circuit 6, it can be judged that the B channel is not used. It should be noted that, when the predetermined time is 10 ms, a significant signal is output from the timer circuit 6 when the idle patterns corresponding to 8 kHz×10 ms=80 frames appear on the B channel continuously. Since the timer circuit 6 is used to prevent an erroneous judgement in a case where a received B channel data is occasionally coincident with the idle pattern, the predetermined time is set such that a significant signal is output from the timer circuit 6 when an idle pattern corresponding to, generally, several frames appears continuously.

When the significant signal (for example, a high level signal) is output from the timer circuit 6, it becomes clear that the state of the B channel is changed from the use state in which the B channel is used to the non-use state in which the B channel is not used. However, it is usual that the output of the timer circuit 6 is an insignificant signal (for example, a low level signal) when the trigger pulse is input from the pulse generator 5 to the timer circuit 6. Therefore, when the disaccord signal is output from the comparator 4, it is judged that the B channel is changed from the non-use state to the use state.

In the embodiment shown in FIG. 2, the significant signal is output from the timer circuit 6 when the B channel is changed from the use state to the non-use state. However, it is possible, by the provision of the comparator 4 which outputs the accord signal, to output the significant signal from the timer circuit 6 when the B channel is changed from the non-use state to the use state.

Figure 1:
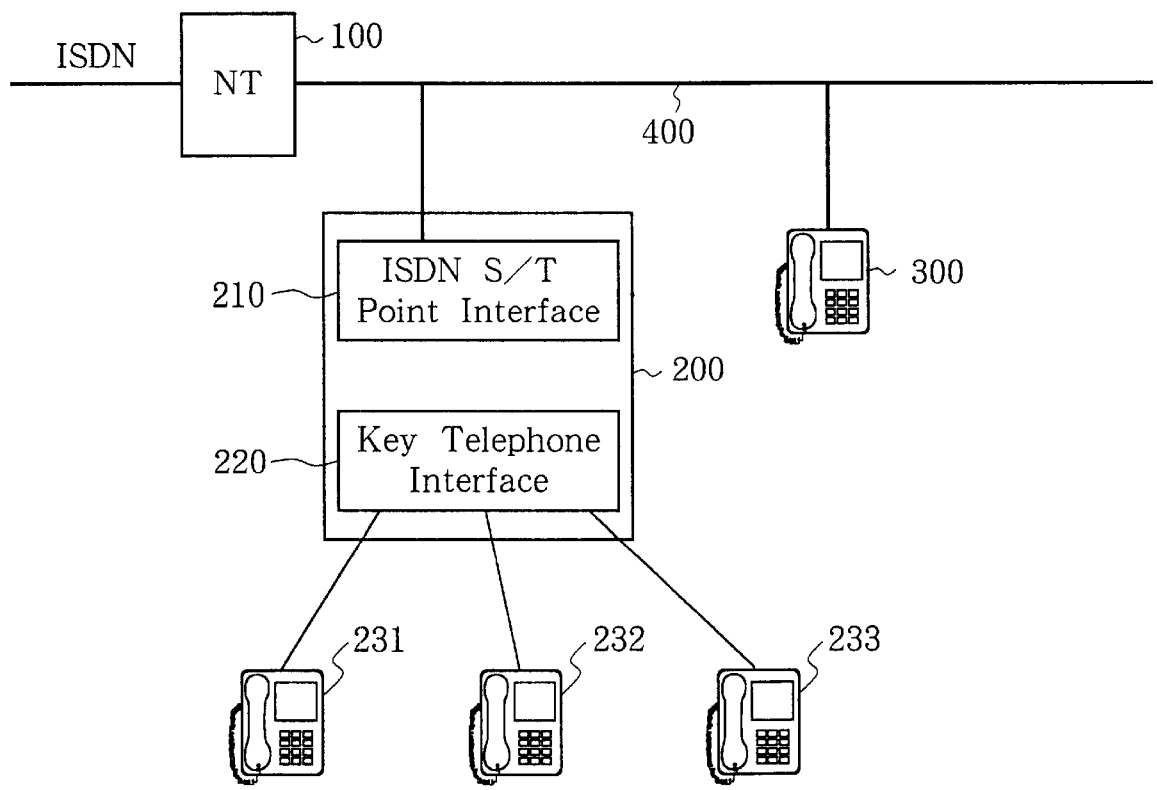
FIG. 1 is a block diagram showing an example of a communication system connected to an ISDN.
Figure 3:
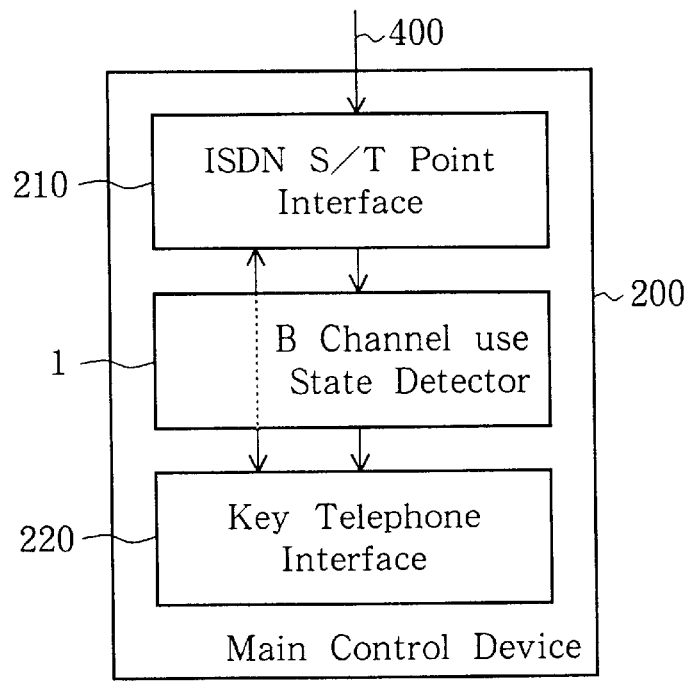
FIG. 3 is a block diagram showing a main control device of a key telephone set using the detection circuit according to the present invention.
Figure 4:
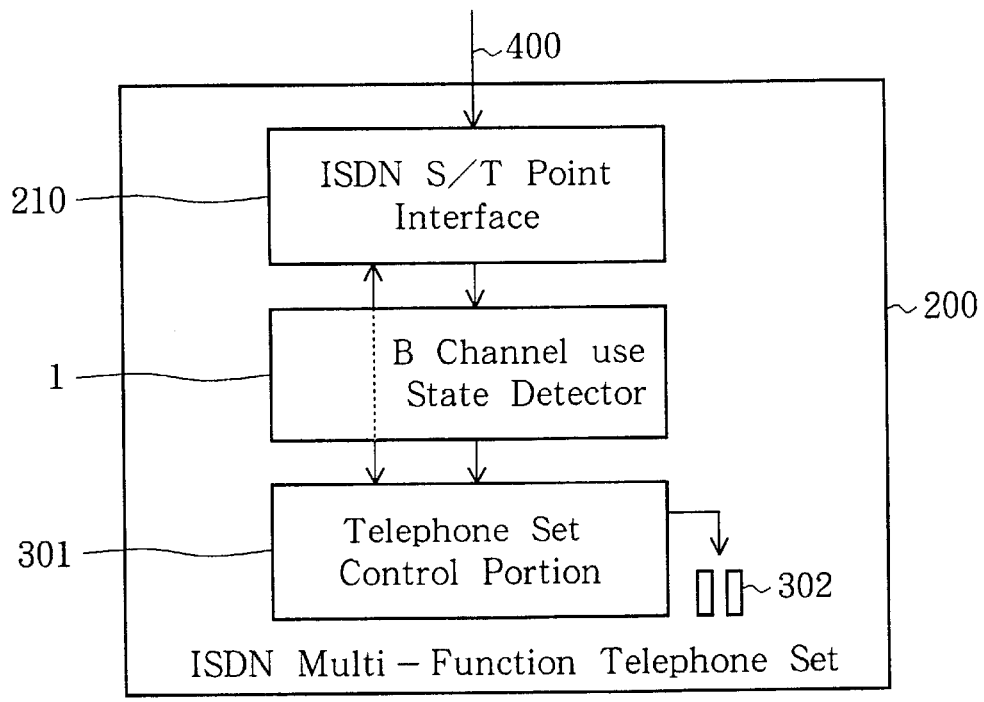
FIG. 4 is a block diagram showing an ISDN multi-function telephone set using the detection circuit according to the present invention.

In the main control device 200 of the key telephone in the system shown in FIG. 1, the key telephone interface portion 220 can recognize the use/the non-use state of the B channel by providing the detection circuit 1 shown in FIG. 2 between the S/T point interface portion 210 and the key telephone interface portion 220 which is the terminal control portion, as shown in FIG. 3. When the B channel is in the use state, it is possible to display on the office line keys of the respective key telephone sets 231, 232 and 233 the use state of the B channel and, when the B channel becomes in the non-use state, to display on the office line keys the non-use state of the B channel. Further, by providing the detection circuit 1 shown in FIG. 2 between the S/T point interface portion 210 and the telephone control portion 301 of the ISDN multi-function telephone set 300 as shown in FIG. 4, it is possible to display the use state of the B channel on the office line key 302.

Figure 5:
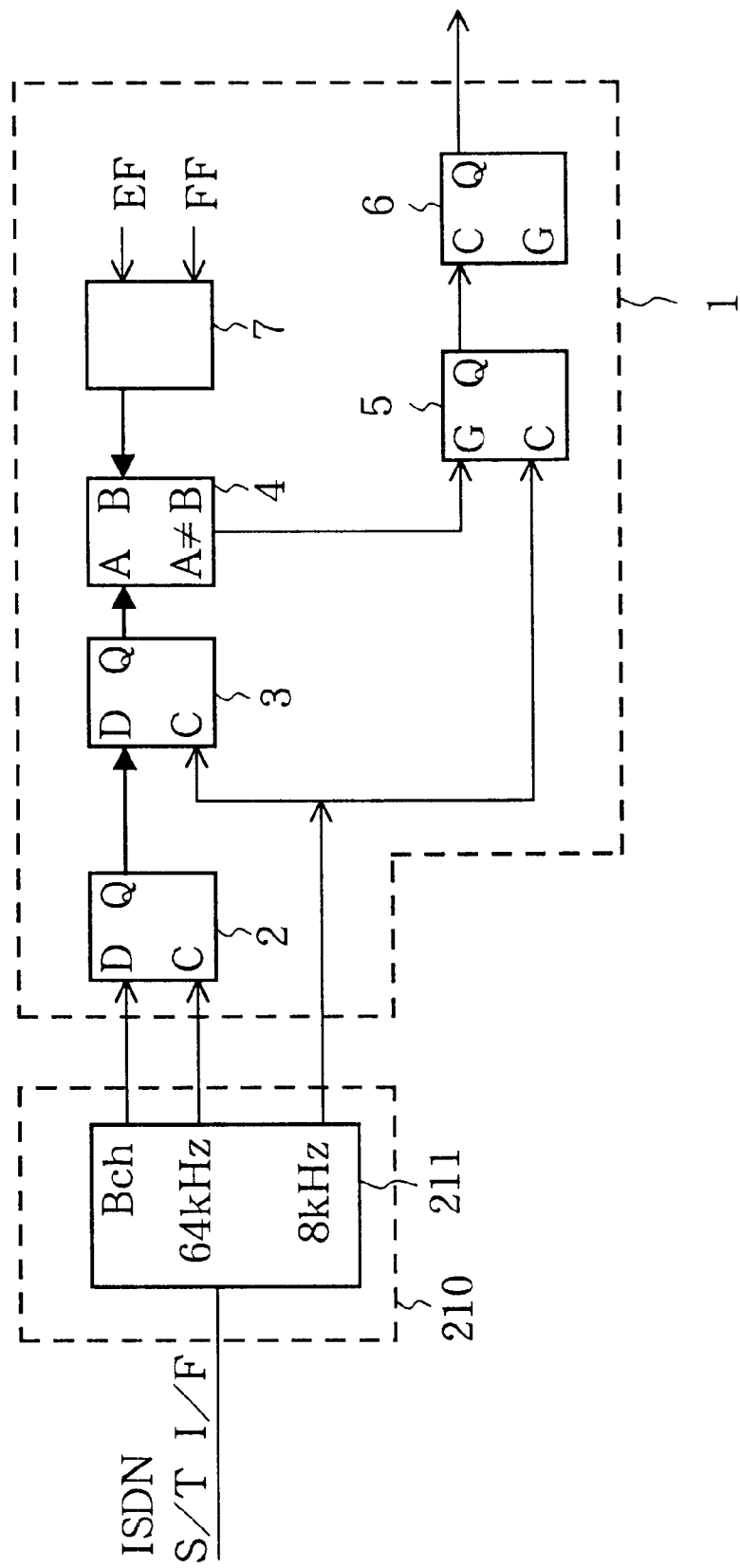
FIG. 5 is a block diagram showing another embodiment of the present invention.

FIG. 5 is a block diagram showing another embodiment of the detection circuit according to the present invention.

In this embodiment, an idle pattern setting portion 7 capable of setting different idle patterns is provided. The idle pattern setting portion 7 can set, for example, "01111111 (EF(H))" and "11111111 (FF(H))" as the idle patterns. These idle patterns can be selected correspondingly to the specification of the ISDN exchange to which the terminal equipment is to be connected. With this idle pattern setting portion 7, it is possible to deal with exchanges having various specifications. It should be noted that EF(H) and FF(H) are mere examples and the idle patterns to be set are determined correspondingly to the respective possible specifications of the ISDN exchanges. Further, three patterns or more can be set in the pattern setting portion 7.

Figure 6:
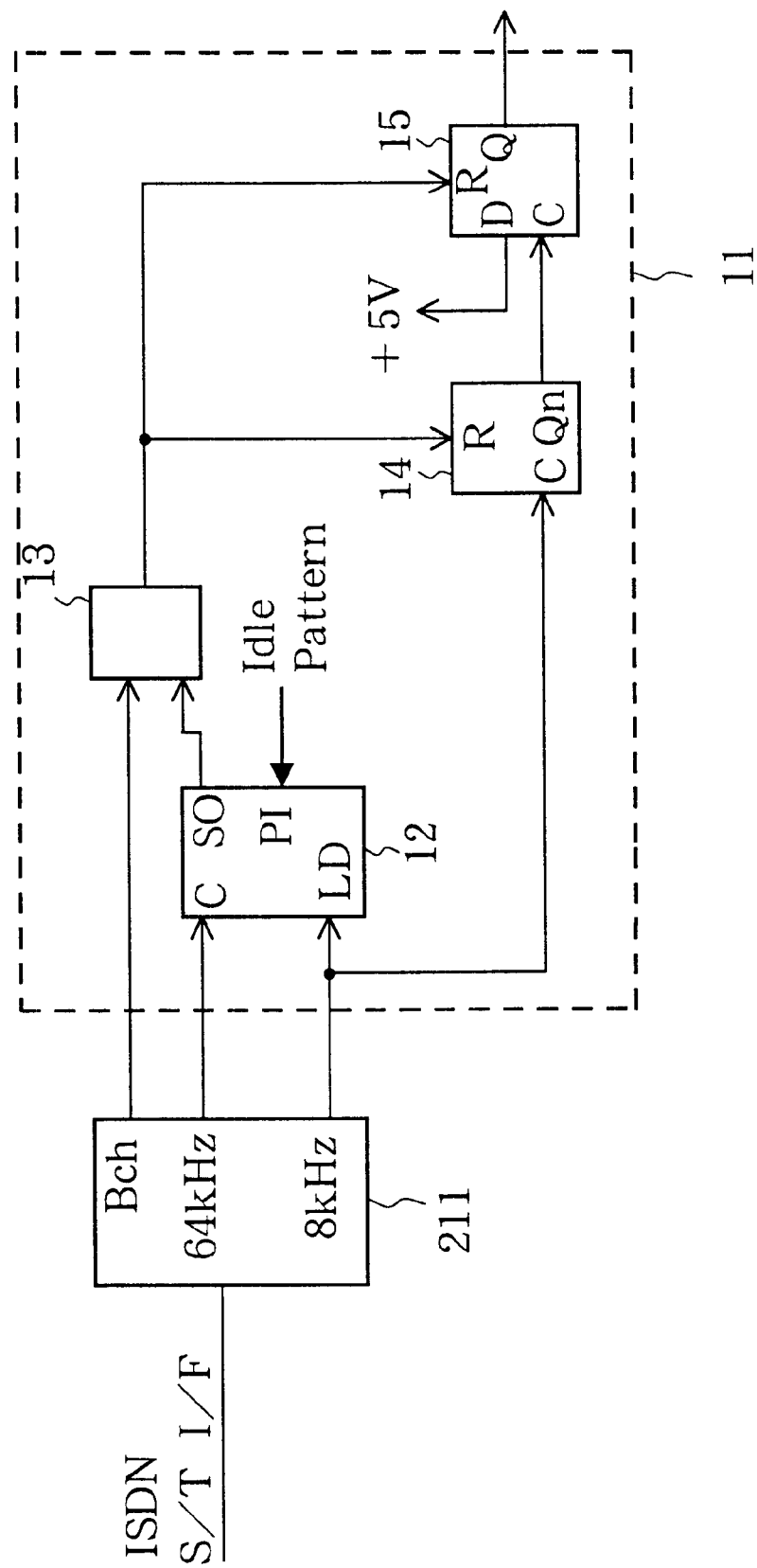
FIG. 6 is a block diagram showing a further embodiment of the present invention.

FIG. 6 is a block diagram of another embodiment of the detection circuit according to the present invention.

As shown in FIG. 6, a detection circuit 11 includes a shift register 12 which is loaded with a preliminarily set idle pattern in responsive to the 8 kHz clock signal from the S/T point interface LSI 211 and shifts its content in response to the 64 kHz clock signal from the S/T point interface LSI 211, an Exclusive-OR circuit (comparator means) 13 which, in the layer 1 synchronized state, exclusive-OR's the B channel data continuously output from the S/T point interface LSI 211 and an output of the shift register 12, a counter (continuity detection means) 14 which counts the 8 kHz clock signals from the S/T point interface LSI 211 and is cleared in response to a high level output of the Exclusive-OR circuit 13 and a latch circuit (use state output means) 15 which outputs a significant signal when a count-up signal is output from the counter 14.

Now, an operation of the embodiment shown in FIG. 6 will be described.

The shift register 12 serially outputs the idle pattern which is preset and appears when the B channel is beng used at a rate of 64 kbps. The Exclusive-OR circuit 13 outputs an exclusive OR of the 64 kbps data which is the B channel data and the output of the shift register 12. Therefore, in this embodiment, the B channel data is compared with the idle pattern every bit. The counter 14 counts the 8 kHz clock signals from the S/T point interface LSI 211. When the counter 14 counts a predetermined number of the clock signals, it outputs the count-up signal. The counter 14 is cleared by the high level output (disaccord output) of the Exclusive-OR circuit 13. The latch circuit 15 outputs the high level signal which is the significant signal, when the counter 14 outputs the count-up signal.

Accordingly, so long as the Exclusive-OR circuit 13 continuously outputs the disaccord signal, the counter 14 does not output the count up signal and hence the latch circuit 15 does not output the high level signal. On the contrary, when there is no disaccord signal output from the Exclusive-OR circuit 13 for a predetermined time period, the latch circuit 15 outputs the high level signal. The absence of disaccord signal from the Exclusive-OR circuit 13 for the predetermined time period means that the idle pattern appears on the B channel continuously for the same predetermined time period. Therefore, when the significant high level signal is output from the latch circuit 15, it can be judged that the B channel is in the non-use state.

Further, since the output of the Exclusive-OR circuit 13 is connected to a reset input of the latch circuit 15 as shown in FIG. 6, the output of the latch circuit 15 becomes low level when the disaccord signal is output again from the Exclusive-OR circuit 13, that is, when the idle pattern disappears in the B channel data. Therefore, it is judged from the low level output from the latch circuit 15 that the B channel is in the use state.

As mentioned above, it can be judged by the circuit construction shown in FIG. 6 whether or not the B channel is in the use state. As shown, the circuit construction shown in FIG. 6 is simpler than that shown in FIG. 2.

Incidentally, the count-up value of the counter 14 can be set according to a manner similar to the predetermined time of the timer circuit 6 of the construction shown in FIG. 2. Further, although, in this embodiment, the counter 14 counts the 8 kHz clock signals from the S/T point interface LSI 211, it is possible that the counter 14 counts other clock signals.

Further, in the construction shown in FIG. 6, it is possible to add a pattern setting portion 7 capable of setting different idle patterns. Further, the detection circuit 12 shown in FIG. 6 may be applied to the main control device 200 of the key telephone set and/or the ISDN multi function telephone set 300 in the system shown in FIG. 1.

As described hereinbefore, according to the present invention in which the detection circuit for detecting the state of use of B channel and the ISDN terminal equipment are constructed such that the signal indicative of the state of use of B channel is output on the basis of the comparison of the B channel data of the ISDN with the preset idle pattern, it is possible, by adding a simple function, to judge whether or not the B channel of the ISDN is in the use state.

Further, it becomes possible to display the state of use of the B channel in the man-machine interface portion on the basis of the signal indicative of the state of use of the B channel and, therefore, it is possible to provide the terminal equipment which can be easily used by a user.

What is claimed is:

1. A detection circuit for detecting the state of use of B channel, comprising:
    comparison means for comparing a B channel data of an ISDN with a preset idle pattern;
    means for providing a signal indicative of a state of use of the B channel on the basis of a comparison result of said comparison means,
    wherein said signal provides indication of said state of use of the B channel to a user.

2. A detection circuit for detecting the state of a B channel, comprising:
    comparison means for comparing a B channel data of an ISDN with a preset idle pattern;
    means for providing a signal indicative of a state of use of the B channel on the basis of a comparison result of said comparison means,
    further comprising continuity detection means for detecting a change in the comparison result of said comparison means, wherein said means for providing a signal indicative of the state of use of the B channel outputs a signal indicative of the B channel state of use when said continuity detection means detects a change in the comparison result.

3. A detection circuit as claimed in claim 2, wherein said comparison means compares a parallel-converted B channel with the idle pattern.

4. A detection circuit as claimed in claim 2, wherein said comparison means compares a B channel serial data with the idle pattern.

5. A detection circuit as claimed in claim 2, further comprising pattern setting means capable of setting a plurality of idle patterns, wherein said comparison means compares the B channel data with a specific idle pattern output from said pattern setting means.

6. An ISDN terminal equipment comprising an S/T point interface portion connected to an S/T point interface of an ISDN interface, a terminal control portion for controlling terminal functions and a man machine interface portion and a detection circuit for detecting a state of use of a B channel, wherein said detection circuit comprises comparison means for comparing a B channel data with a preset idle pattern and means for providing a signal indicative of the state of use of the B channel on the basis of a comparison result of said comparison means,
    further comprising a continuity detection circuit configured to detect a change in the comparison result of said comparison means, wherein said means for providing a signal indicative of the state of use of the B channel outputs a signal indicative of the B channel state of use when said continuity detection means detects the change in the comparison result.

7. An ISDN terminal equipment as claimed in claim 6, wherein said terminal control portion displays the state of use of the B channels in said man-machine interface portion when an output signal of said means of providing a signal indicative of the state of the use of B channel indicates that the B channels are being used and displays the non-use sate of the B channels in said man-machine interface portion when an output signal of said means for providing a signal indicative of the state of use of B channel indicates that the B channels are not used.

8. A method of detecting a state of use of a B channel of an ISDN, said method comprising:
    comparing a B channel data of an ISDN with a preset idle pattern; and,
    transmitting to one of a terminal equipment and a telephone unit a signal indicative of the state of use of said B channel on the basis of a result of the comparison,
    wherein said signal provides indication of said state of use of B channel to a user.

9. A method of detecting a state of use of a B channel of an ISDN, said method comprising:
    comparing a B channel data of an ISDN with a preset idle pattern; and,
    transmitting to one of a terminal equipment and a telephone unit a signal indicative of the state of use of said B channel on the basis of a result of the comparison,
    the method further comprising detecting whether the comparison result has changed and transmitting a signal indicative of the state of use of the B channel based on the change detected.

* * * * *